Sept. 8, 1964   L. J. MISURACA   3,147,859
PHOTOGRAPHIC SLIDE MAGAZINE
Original Filed March 20, 1958
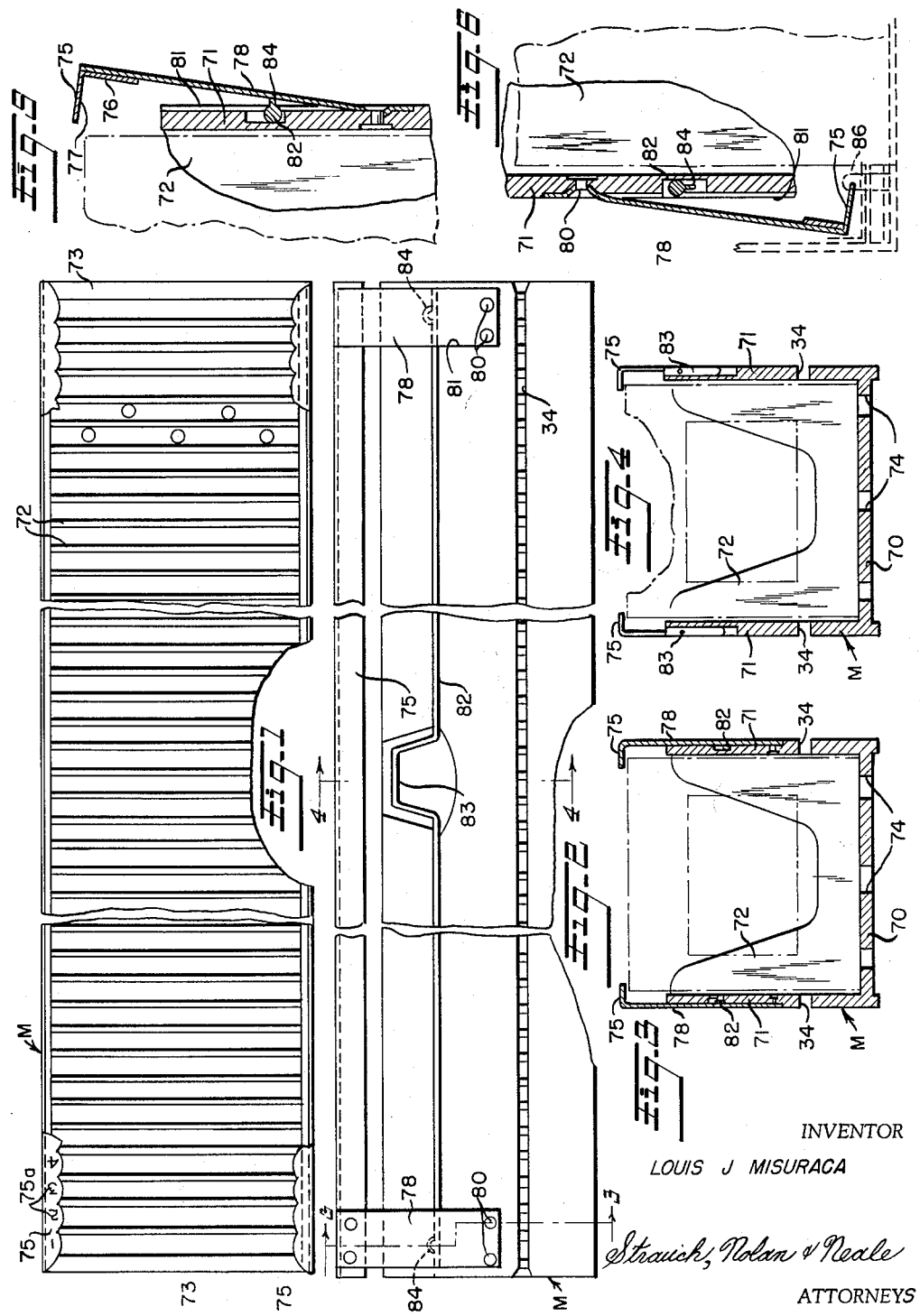
INVENTOR
LOUIS J MISURACA
Strauch, Nolan & Neale
ATTORNEYS

United States Patent Office 3,147,859
Patented Sept. 8, 1964

3,147,859
PHOTOGRAPHIC SLIDE MAGAZINE
Louis J. Misuraca, Glendale, Calif., assignor, by mesne assignments, to Argus Incorporated, a corporation of Delaware
Original application Mar. 20, 1958, Ser. No. 723,623. Divided and this application Feb. 9, 1960, Ser. No. 12,889
3 Claims. (Cl. 206—62)

This invention has to do with photographic slide magazines.

The major object of this invention is to provide a novel photographic slide magazine wherein the individual slides are retained in their pockets or cells by a retainer that may be moved to inoperative position when it is desired to insert or withdraw slides from the magazine.

A further object of the invention is to provide a novel structure for mounting, locating and moving such a retainer.

These and other objects will be apparent from the drawings and the following description. Referring to the drawings:

FIG. 1 is a plan view of a slide magazine according to a preferred embodiment of the invention;

FIG. 2 is a side elevational view of the magazine of FIG. 1;

FIGS. 3 and 4 are cross-sectional views on lines 3—3 and 4—4 of FIG. 2, respectively;

FIG. 5 is an enlarged fragmentary sectional view showing a slide retainer held in inactive position by the manual control member on the magazine.

FIG. 6 is an enlarged fragmentary sectional view of an inverted magazine as the same appears when in the projector adjacent the slide chute and the slide retainer is moved to inactive position by means on the projector.

The drawing shows a slide magazine M which is adapted to be used in an automatic slide projector such as that disclosed and claimed in parent application Serial No. 723,623, filed March 20, 1958, for Automatic Slide Projector, and of which the present application is a division.

Referring now to FIGS. 1-6, which illustrate a preferred form of magazine, this comprises an apertured bottom wall 70, corresponding side walls 71 and evenly spaced, laterally extending partitions 72 which form pockets for receiving the individual slides. The magazine also has end walls 73 which are substantially rectangular.

On each side wall I provide a flexible slide retainer 75 which may be made of metal and which runs the entire length of the magazine. Each member 75 has a side section 76 and an inwardly disposed scalloped flange 77. The side sections are supported, respectively, on a pair of flat, spring metal brackets 78 attached by rivets 80 or other means to the side walls of the magazine. The brackets normally lie against the sides of the magazines in recesses 81. However, to insert or remove slides it is necessary to move the slide retainers outwardly as shown in FIGS. 5 and 6. This may be accomplished manually (FIGURE 5) by rotating a rod 82 which has a central crank 83, the ends of the bar being provided with eccentric end portions 84 beneath the brackets 78. The rod is recessed into the side walls of the magazine.

FIGURE 6 illustrates automatic displacement of the slide retainers. When the magazine is inserted into the projector the slide retainers are cammed outwardly automatically when they engage fixed pins 86 (only one shown in FIGURE 6) on the projector. These pins also serve as an indexing means in conjunction with the scalloped edges 75a of the flanges 77.

If desired the magazine may have indicia on its bottom wall designating the numbers of the slide pockets therein, for viewing when the magazine may be inverted during operation.

This automatic control of the slide retainers is further described and claimed in said Serial No. 723,623 to which reference is made for necessary further detail.

While I have shown and described a preferred form of my invention, I contemplate that various changes and modifications can be made therein without departing from the invention, the scope of which is indicated by the following claims.

I claim:

1. A slide carrying tray comprising, in combination; an elongated tray having a rectangular cross-section, open at one side, and first and second walls interconnected by septums to hold slides in spaced relation for movement from and to the tray through said one side by slide changing means; slide retaining means extending longitudinally along and beyond the edge of said first wall adjacent said open side having a projecting lip for overlying slides to prevent removal thereof, resilient arm means comprising longitudinally spaced spring metal strips secured at one end to the ends of said slide retaining means and extending tranversely across said first wall toward the opposite edge thereof, and means securing the other ends of said strips to said first wall, said resilient arm means biasing said slide retaining means into slide retaining position and permitting swinging movement thereof together with said lip away from said slide overlying position and withdrawal of slides from the tray.

2. A photographic slide magazine adapted to be mounted for selective displacement along a longitudinal guide path in a slide projector having parallel side walls joined at opposite ends by parallel end walls and a bottom wall, said magazine being open at its top for the reception and withdrawal of slides, lateral partitions parallel to the end walls dividing the interior of said magazine into a plurality of individual slide receiving cells of generally rectangular cross section all open to said open top of the magazine, a slide retainer mounted externally on said magazine for swinging movement between a slide retaining position at said open top where it overlies at least a part of each cell to block the slide therein against withdrawal from the magazine and an inactive position where it is clear of said open top, and a manual operating member pivoted about an axis extending along the length of the container and having operative motion transmitting connection with said slide retainer.

3. A photographic slide magazine adapted to be mounted for selective displacement along a longitudinal guide path in a slide projector having parallel side walls joined at opposite ends by parallel end walls and a bottom wall, said magazine being open at its top for the reception and withdrawal of slides, lateral partitions parallel to the end walls dividing the interior of said magazine into a plurality of isdividual slide receiving cells of generally rectangular cross section all open to said open top of the magazine, a slide retainer mounted externally on said magazine for movement between a slide retaining position at said open top where it overlies at least a part of each cell to block the slide therein against withdrawal from the magazine and an inactive position where it is clear of said open top, and manually operated means on said magazine for moving said slide retainer to said inactive position and positively holding it there during extraction and insertion of slides with respect to the magazine.

References Cited in the file of this patent

UNITED STATES PATENTS

| | | |
|---|---|---|
| 2,477,786 | Bruen | Aug. 2, 1949 |
| 2,575,766 | Olson | Nov. 20, 1951 |
| 2,590,492 | Bennett | Mar. 25, 1952 |
| 2,829,767 | Scripture | Apr. 8, 1958 |
| 2,900,074 | Windman | Aug. 8, 1959 |

FOREIGN PATENTS

| | | |
|---|---|---|
| 608,164 | Germany | Jan. 17, 1935 |